United States Patent [19]

Reed

[11] Patent Number: 4,691,405
[45] Date of Patent: Sep. 8, 1987

[54] TOOTHBRUSH HAVING ADJUSTABLE BRISTLE-MOUNTED TABS

[76] Inventor: Joseph C. Reed, 114 5th St., Seal Beach, Calif. 90740

[21] Appl. No.: 759,896

[22] Filed: Jul. 29, 1985

[51] Int. Cl.$^4$ ............................................. A46B 9/04
[52] U.S. Cl. ................................. 15/201; 15/167 R; 264/243; 425/451.9
[58] Field of Search ..................... 15/201, 203, 167 R, 15/144 R, DIG. 5, DIG. 6; 16/225, 226, DIG. 13; 264/243; 425/451.9

[56] References Cited

U.S. PATENT DOCUMENTS

| | | | |
|---|---|---|---|
| 1,928,328 | 9/1933 | Carpentier | 15/167 R |
| 2,438,268 | 3/1948 | Bressler | 15/167 R |
| 3,065,485 | 11/1962 | Solani | 15/144 R X |
| 3,152,349 | 10/1964 | Brennesholtz | 15/167 R |

Primary Examiner—Peter Feldman
Attorney, Agent, or Firm—Bogucki, Scherlacher, Mok & Roth

[57] ABSTRACT

In a toothbrush having a pair of adjustable bristle-mounting tabs which pivot relative to the bristle-mounting base so that the bristles mounted on the tabs may deflect in order to conform to varying tooth surfaces, a metal plate formed within the head of the toothbrush has opposite lobes thereof which extend into and form part of the tabs to provide better hinging action for the tabs and to prevent the tabs from breaking off and possibly being swallowed. The toothbrush is made using an injection mold, the lower half of which has a pair of dowels which are inserted in apertures within the opposite lobes of the metal plate to initially position the metal plate therein. The lower half and an opposite mating upper half together provide opposite mating pins which engage the opposite sides of the metal plate so as to precisely position the plate within a cavity defined by the joined opposite halves of the mold. Plastic material is injected into the cavity so as to surround the metal plate and form a toothbrush frame. Following removal of the formed toothbrush frame from the mold, holes are drilled in the base and the adjoining pair of tabs and groups of bristles are inserted in such holes to form the completed toothbrush.

11 Claims, 19 Drawing Figures

TOOTHBRUSH HAVING ADJUSTABLE BRISTLE-MOUNTED TABS

BACKGROUND OF THE INVENTION

1. Field of the Invention

The present invention relates to toothbrushes, and more particularly to toothbrushes in which the bristle-mounting base thereof has one or more flexible elements pivotally coupled to the base.

2. History of the Prior Art

It is known to provide toothbrushes in which the bristle-mounting base thereof has one or more flexible elements which are pivotable relative to the base. An example of such a toothbrush is provided by U.S. Pat. No. 3,152,349 which was issued Oct. 13, 1964. The patent describes a toothbrush having a bristle-mounting base which includes a pair of tabs located in a central region of the base. The tabs are joined to the base by small segments of the plastic material which forms the base and the tabs so as to be pivotable relative to the base. Groups of relatively soft bristles are mounted on the base itself, while groups of relatively stiff bristles are mounted on the toothbrush tabs. During brushing, the softer outer groups of bristles mounted on the base gently brush the gums and adjacent portions of the teeth while the stiffer bristle groups brush and cleanse the more durable chewing surfaces of the teeth. The adjustable tabs pivot as necessary relative to the base of the toothbrush so that the stiffer bristle groups mounted on the tabs can conform to and better follow the contours of the chewing surfaces of the teeth during the brushing action.

Toothbrushes of the type described in previously referred to U.S. Pat. No. 3,152,349 have been found to be advantageous over more conventional toothbrush designs. Such brushes have been found to provide very thorough cleansing action of the teeth and particularly the chewing surfaces thereof while at the same time cleansing the gums and adjacent portions of the teeth in gentle, non-harmful fashion. However, such toothbrush design is not without its disadvantages. The tabs are joined to the base of the toothbrush by relatively thin segments of the plastic material forming both the base and the tabs to provide for pivoting action of the tabs relative to the base. The thin plastic segments which form hinges between the tabs and the base tend to fatigue and lose their "memory" with continued use of the toothbrush. The tabs fail to return to a neutral, non-pivoting position within the base, and brushing action is impaired. Eventually, the thin plastic segments becomes so weak that the tabs may break off from the base. This seriously limits the usefulness of the brush. Moreover, breaking off of the tabs on the base of the toothbrush usually occurs during brushing, with the attendant danger that the broken tab and included bristles will be swallowed.

Accordingly, it would be desirable to provide a toothbrush of the type having one or more flexible, bristle-mounting tabs or other elements in which the hinging action between the tabs and the base is improved and in which the possibility of the tabs breaking off of the base is greatly minimized or eliminated.

BRIEF DESCRIPTION OF THE INVENTION

The present invention provides a toothbrush having one or more flexible, bristle-mounting tabs within the bristle-mounting base. The tabs are coupled to the base in a manner which provides for improved hinging action including retention of the "memory" of the hinges so that the tabs tend to return to a neutral position within the base, even after prolonged use of the toothbrush. At the same time, the possibility of the tabs breaking off from the base at the hinge therebetween is greatly minimized or eliminated.

The present invention accomplishes these objectives by forming the frame of the toothbrush with a metal plate that extends through the base and into the tabs. The metal plate is included within thin sections of the plastic material forming the base and the tabs to form hinges between the tabs and the base. Such hinges enable substantial pivoting movement of the tabs while at the same time providing good hinge memory, even after prolonged use of the toothbrush. Such hinges also greatly minimize if not eliminate the possibility of one or both of the tabs breaking off the base.

In a preferred embodiment of an improved toothbrush according to the invention, the frame of the toothbrush is formed by injection molding so that a single, relatively thin metal plate is disposed within the generally planar base of the toothbrush frame. The metal plate has a pair of lobes which extend inwardly from opposite ends of the plate and into a pair of elongated, generally rectangular tabs formed at a central portion of the frame. Groups of bristles are mounted on each of the tabs as well as on the tabs. Portions of the opposite lobes of the metal plate are surrounded with thin overlying plastic sections to form hinges between the tabs and the base.

A preferred method of making a toothbrush in accordance with the invention utilizes the opposite halves of an injection mold having recesses therein which combine to form a cavity therebetween when the opposite halves are joined together. The metal plate is initially positioned within the lower half of the mold by inserting a pair of dowels mounted within the recess in the lower half of the mold into apertures into the opposite lobes of the metal plate as the metal plate is dropped onto the lower mold half. The metal plate is then lowered onto a plurality of pins mounted within the recess in the lower mold half. With the upper mold half positioned over the lower mold half, a plurality of pins mounted within the recess of the upper mold half also extend into contact with the metal plate in mating relation with the pins mounted on the lower mold to provide for positioning of the metal plate at a precise location within the mold cavity.

With the metal plate precisely positioned within the mold cavity, a plastic material such as nylon is injected into the mold cavity under high pressure so as to fill the cavity and surround the metal plate, the pins and the dowels therein. The plastic material surrounds the metal plate to form a toothbrush frame which includes an elongated handle having a base at one end thereof. The base which includes the metal plate has a pair of pivotable tabs formed at a central region thereof and joined to the base by thin sections of plastic and portions of the metal plate. The formed toothbrush frame is separated from the mold by first separating the mold halves from one another such that the toothbrush frame separates from the lower half of the mold and remains with the upper half of the mold. The toothbrush frame is then separated from the upper half of the mold by activating a plurality of movable ejector pins mounted within the upper half of the mold into the recess in the lower half of the mold so as to push the toothbrush frame out of the recess and off the pins mounted within the recess and extending into the formed toothbrush frame.

Following separation of the toothbrush frame from the mold, holes are drilled in the two tabs and in the base. Two different pluralities of bristle groups which typically are relatively stiff in nature are then mounted within the holes formed in the two different tabs and a third plurality of bristle groups which are typically relatively soft in nature are mounted within the holes in the base to complete formation of the toothbrush.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
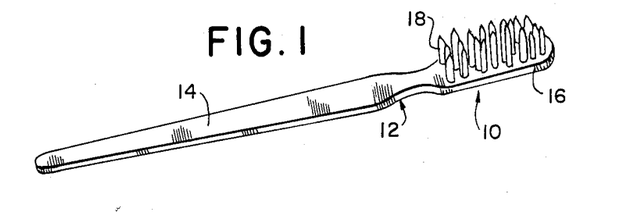
FIG. 1 is a perspective view of a toothbrush in accordance with the invention.

FIG. 1 depicts a toothbrush 10 in accordance with the invention. The toothbrush 10 includes a frame 12 having an elongated handle 14 and a base 16 integrally formed with the handle 14 at one end thereof. The base 16 has a plurality of groups of bristles 18 mounted thereon.

Figure 2:
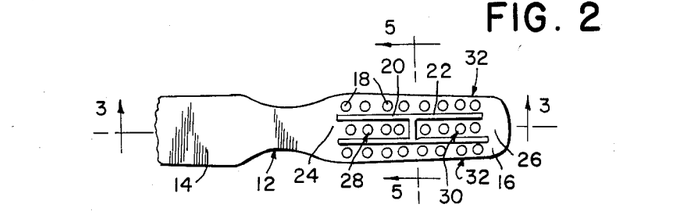
FIG. 2 is a top view of a portion of the toothbrush of FIG. 1 illustrating the base and included tabs thereof.

The base 16 and the arrangement of the bristles 18 thereon are shown in greater detail in FIG. 2. The base 16 which is relatively thin and of generally planar configuration includes a pair of tabs 20 and 22 disposed within and coupled to the base 16 at a central region of the base 16. The tab 20 is hingedly coupled to the base 16 at a hinging region 24. The tab 22 is hingedly coupled to the base 16 at a hinging region 26. A first plurality 28 of the bristles 18 comprising four different groups thereof is mounted on the tab 20. A second plurality 30 of the bristles 18 comprised of four different groups thereof is mounted on the tab 22. A third plurality 32 of the bristles 18 comprising 16 groups thereof arranged into two different rows is mounted on the base 16. The bristles 18 in the first and second pluralities 28 and 30 are relatively stiff, whereas the bristles 18 in the third plurality 32 are softer.

Figure 3:
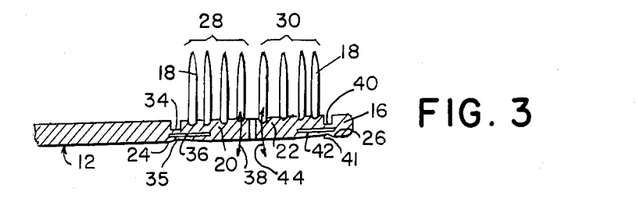
FIG. 3 is a sectional view taken along the line 3—3 of FIG. 2.
Figures 4, 5:
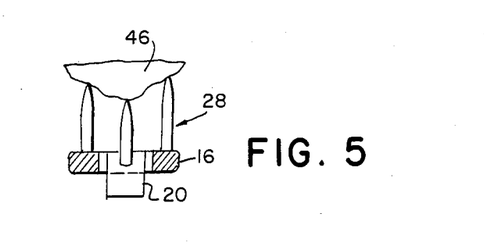
FIG. 4 is a sectional view similar to that of FIG. 3 and illustrating the manner in which the tabs are movable to enable the bristle groups mounted thereon to conform to varying tooth surfaces.
FIG. 5 is a sectional view taken along the line 5—5 of FIG. 2 and in which the tabs have been moved into the position shown in FIG. 4.

FIGS. 3-5 illustrate the manner in which the tabs 20 and 22 which are of elongated, generally rectangular configuration are movable by pivoting relative to the base 16 during use of the toothbrush 10. As shown in FIG. 3 the tab 20 is hingedly coupled to the base 16 in the hinging region 24 which includes a thin layer 34 of plastic material disposed over a lobe 36 forming a part of a metal plate disposed within the base 16 and described in detail hereafter. The hinging region 24 also includes a thin layer 35 of plastic material disposed under the lobe 36. This enables the tab 20 to pivot either upwardly or downwardly relative to the base 16 in response to pressure on the bristles 18 mounted in the tab 20 as illustrated by an arrow 38. Similarly, the tab 22 is hingedly coupled to the base 16 at the hinging region 26 by thin layers 40 and 41 of plastic material disposed over and under a lobe 42 respectively. The lobe 42 and the lobe 36 form portions of the metal plate described hereafter. This enables the tab 22 to pivot either upwardly or downwardly relative to the base 16 as shown by an arrow 44 in response to varying pressure on the bristles 18 mounted on the tab 22.

The manner in which the tabs 20 and 22 pivot during use of the toothbrush 10 is shown in FIG. 4 and 5. As previously noted the first and second pluralities 28 and 30 of the bristles 18 are relatively stiff. These groups of bristles are designed to provide maximum brushing action on the chewing surfaces of teeth such as a tooth 46. In the illustration of FIGS. 4 and 5 the tabs 20 and 22 have both pivoted downwardly relative to the base 16 so that the pluralities 28 and 30 of the bristles 18 are able to reach the various chewing surfaces of the tooth 46. When pressure on the pluralities 28 and 30 of the bristles 18 is removed, the resiliant nature of the lobes 36 and 42 and the thin layers 34, 35, 40 and 41 returns the tabs 20 and 22 to their nominal or home positions within the base 16. The tabs 20 and 22 simply pivot as necessary to enable the pluralities 28 and 30 of the bristles 18 mounted thereon to follow the surfaces of the teeth being brushed.

As the relatively stiff pluralities 28 and 30 of the bristles 18 function in the manner described, the softer third plurality 32 of the bristles 18 mounted on the base 16 brush adjacent portions of the teeth and gums in a manner which provides adequate brushing and cleansing action without irritating or injuring the gums. The portions of the lobes 36 and 42 of the metal plate which form the major portions of hinges coupling the tabs 20 and 22 to the base 16 provide various advantages in accordance with the invention. These advantages include better hinging action with improved hinge "memory" in which the tabs 20 and 22 resiliently return to the nominal or home positions within the plane of the base 16, even after prolonged use of the toothbrush 10. Other advantages arise from the fact that the lobes 36 and 42 are very difficult to snap or break. This acts to greatly minimize if not eliminate the possibility of the tabs 20 and 22 breaking off the base 16, particularly while the toothbrush 10 is in use.

Figure 6:
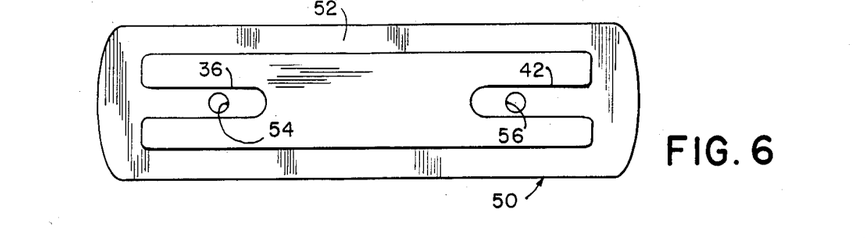
FIG. 6 is a plan view of the metal plate in the toothbrush of FIG. 1.
Figures 7, 8:
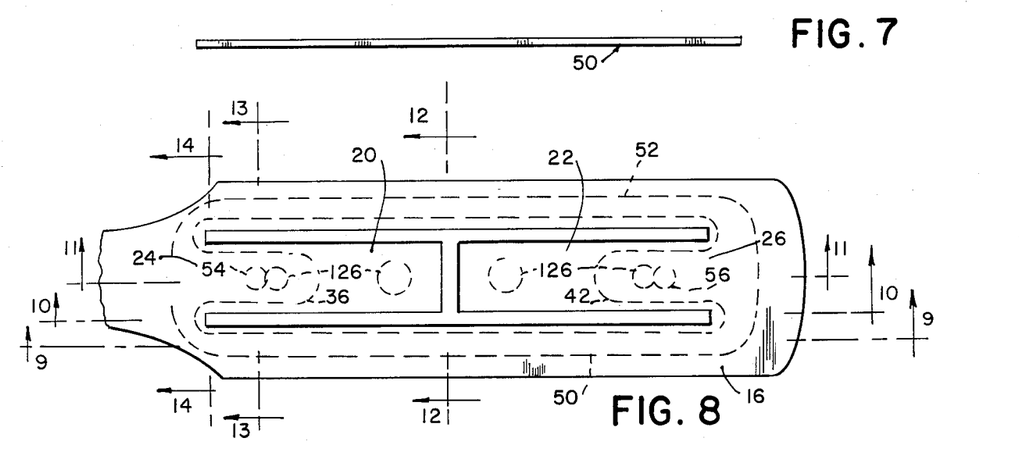
FIG. 7 is a side view of the metal plate of FIG. 6.
FIG. 8 is an enlarged plan view of the bottom of the base of the toothbrush of FIG. 1 with the metal plate therein being shown in dotted outline.

As previously noted the lobes 36 and 42 comprise portions of a metal plate. Such a metal plate 50 is shown in detail in FIGS. 6 and 7. As shown in FIG. 6 the lobes 36 and 42 extend inwardly from the opposite ends of a generally continuous outer portion 52 of the metal plate 50. As described hereafter, the generally continuous outer portion 52 basically resides within the base 16. The lobes 36 and 42 extend from the base 16 into the tabs 20 and 22 respectively and form a major portion of the hinges therebetween. The lobe 36 has an aperture 54 therein. Similarly, the lobe 42 has an aperture 56 therein. As described hereafter the apertures 54 and 56 are used during the initial placement of the metal plate 50 within a mold used to form the frame 12 of the toothbrush 10. As shown in FIG. 7 the metal plate 50 is of relatively thin, generally planar configuration.

FIG. 8 shows the base 16 of the toothbrush 10 in enlarged, detailed fashion as viewed from the bottom thereof. The various pluralities of the bristles 18 shown in FIG. 2 are omitted from FIG. 8 and the related FIGS. 9-14 for clarity. The metal plate 50 is shown in dotted outline in FIG. 8, to illustrate the position that the metal plate 50 assumes within the base 16 and the tabs 20 and 22. As illustrated in FIG. 8 the tab 20 which is of elongated, generally rectangular configuration is separated from the base 16 along three sides thereof and is hingedly coupled to the base 16 at a fourth side thereof at the hinging region 24. Similarly, the tab 22 which is also of elongated, generally rectangular configuration is separated from the base 16 along three sides thereof and is coupled to the base 16 at a fourth side thereof at the hinging region 26.

Figure 9:
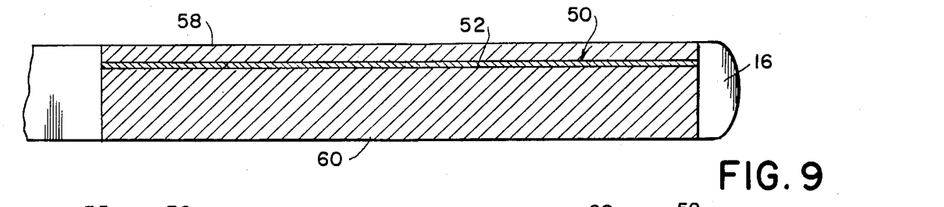
FIG. 9 is a sectional view of FIG. 8 taken along the line 9—9 thereof.

The various sectional views of FIGS. 9-14 illustrate the structure of FIG. 8 in greater detail. FIG. 9 shows that the generally continuous outer portion 52 of the metal plate 50 is disposed within the base 16 between and generally parallel to opposite broad surfaces 58 and 60 of the base 16. The metal plate 50 is disposed considerably closer to the lower broad surface 58 than to the opposite upper broad surface 60.

Figure 10:
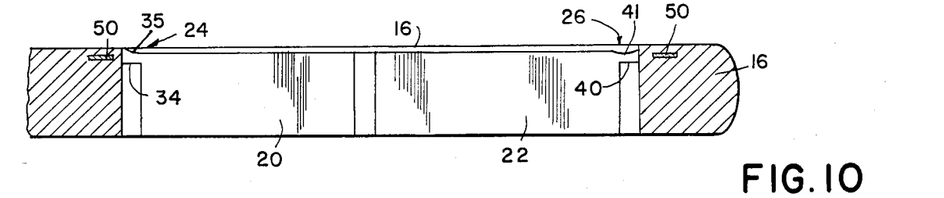
FIG. 10 is a sectional view of FIG. 8 taken along the line 10—10 thereof.
Figure 11:
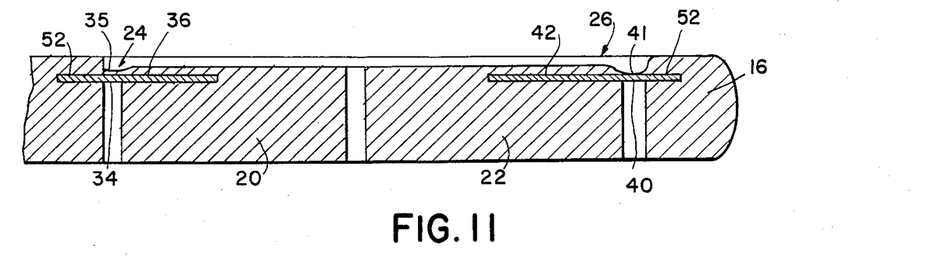
FIG. 11 is a sectional view of FIG. 8 taken along the line 11—11 thereof.

FIGS. 10 and 11 illustrate in greater detail the nature of the hinging regions 24 and 26 where the tabs 20 and 22 are coupled to the base 16. The hinging region 34 which couples the tab 20 to the base 16 includes the thin layers 34 and 35 and 2 portion of the lobe 36 of the metal plate 50 disposed therebetween. The hinging region 26 where the tab 22 is coupled to the base 16 includes the thin layers 40 and 41 and the portion of the lobe 42 of the metal plate 50 disposed therebetween.

Figure 12:
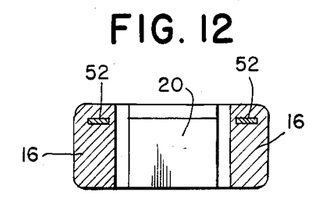
FIG. 12 is a sectional view of FIG. 8 taken along the line 12—12 thereof.
Figure 13:
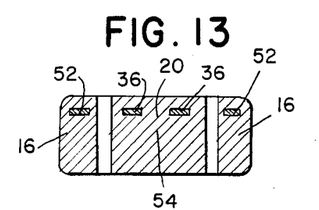
FIG. 13 is a sectional view of FIG. 8 taken along the line 13—13 thereof.
Figure 14:
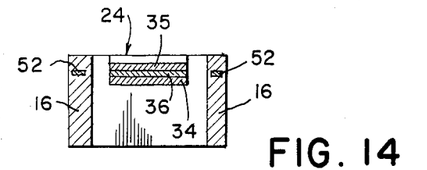
FIG. 14 is a sectional view of FIG. 8 taken along the line 14—14 thereof.

FIGS. 12-14 illustrate further details of the disposition of the metal plate 50 within the base 16, the configuration of the tab 20 and the configuration of the hinging region 24.

Figure 15:
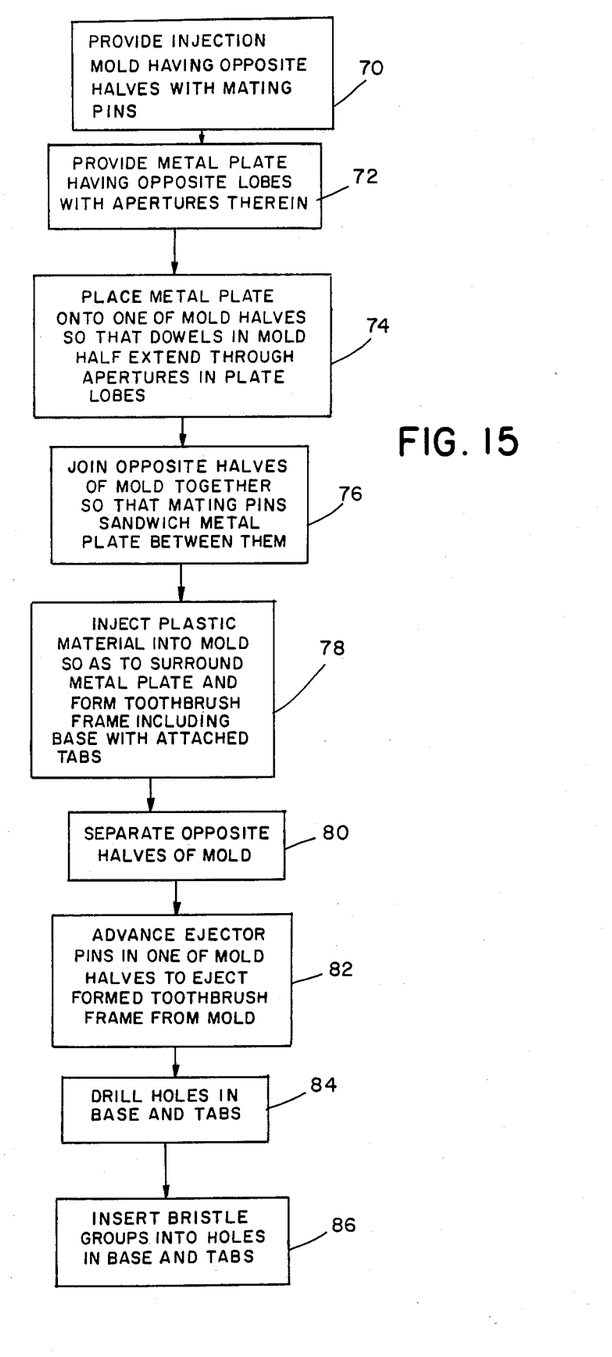
FIG. 15 is a block diagram of the successive steps in a preferred method of making the toothbrush of FIG. 1.

The successive steps of a method of making the toothbrush 10 in accordance with the invention are illustrated in FIG. 15.

In a first step 70 an injection mold is provided. The injection mold is comprised of opposite upper and lower halves with mating pins for holding the metal plate 50 in a precise position within a cavity of the mold, as described hereafter.

In a second step 72 the metal plate 50 is provided. As previously described, the metal plate 50 has the generally continuous outer portion 52 and the pair of lobes 36 and 42 extending inwardly from opposite ends of the outer portion 52. The lobes 36 and 42 are provided with apertures 54 and 56 respectively.

In a third step 74 the metal plate 50 is placed on the lower half of the opposite mold halves so that dowels in the lower mold half extend through the apertures 54 and 56. This serves to initially position the metal plate 50 within the lower mold half.

In a fourth step 76 the opposite halves of the injection mold are joined together so that mating pins mounted within recesses in the two halves sandwich the metal plate 50 therebetween. This serves to precisely locate the metal plate within the cavity formed by the opposite recesses of the mold halves so that the metal plate assumes the position desired within the toothbrush frame 12 when the frame 12 is formed within the mold cavity.

In a fifth step 78 plastic material such as nylon which has been heated to a molten state is injected into the cavity of the injection mold under high pressure. This causes the plastic material to completely fill the cavity as well as to surround the metal plate 50. As the plastic material hardens, the toothbrush frame 12 is formed, which frame 12 includes the base 16 with the attached tabs 20 and 22.

With the toothbrush frame 12 formed within the mold during the fifth step 78, the opposite mold halves are separated in a sixth step 80. The opposite mating pins extend into the toothbrush frame 12 on opposite sides thereof from the opposite halves of the mold. However, because the pins from the lower mold half extend into the frame 12 to a considerably smaller depth than do the pins from the upper mold half, the frame 12 tends to remain with the upper mold half when the opposite upper and lower mold halves are separated. When the opposite mold halves are separated, the pins and dowels mounted in the recess within the lower mold half simply pull out of the toothbrush frame 12, leaving small apertures in the frame 12.

In a seventh step 82, ejector pins which are slidably mounted within the upper mold half are advanced into the recess in the upper mold half to eject the formed toothbrush frame 12 from the upper mold half. The ejector pins bear against the side of the frame 12 and push the frame 12 free of the pins mounted in the recess within the upper mold half. As the toothbrush frame 12 is pushed away from the upper mold half, small apertures are left in the frame 12 as the pins are withdrawn from the frame 12.

In an eighth step 84 holes are drilled in the base 16 and the tabs 20 and 22 of the toothbrush frame 12. Four holes are drilled in each of the tabs 20 and 22, and two rows of eight holes are drilled in the base 16, to provide for the mounting of bristle groups as seen in FIG. 2.

In a ninth and final step 86, groups of the bristles 18 are mounted on the base 16 and the tabs 20 and 22. Each group of the bristles 18 is inserted into a different one of the holes where it is mounted by any conventional bristle mounting technique such as by insertion of the bristles of the group together with a staple in the form of a small, cup-shaped metallic element. As previously noted the groups of the bristles 18 mounted within the holes in the tabs 20 and 22 are preferably stiffer in nature, while the groups of the bristles 18 mounted within the holes in the base 16 are softer. Installation of the groups of bristles 18 completes the toothbrush 10.

Figure 16:
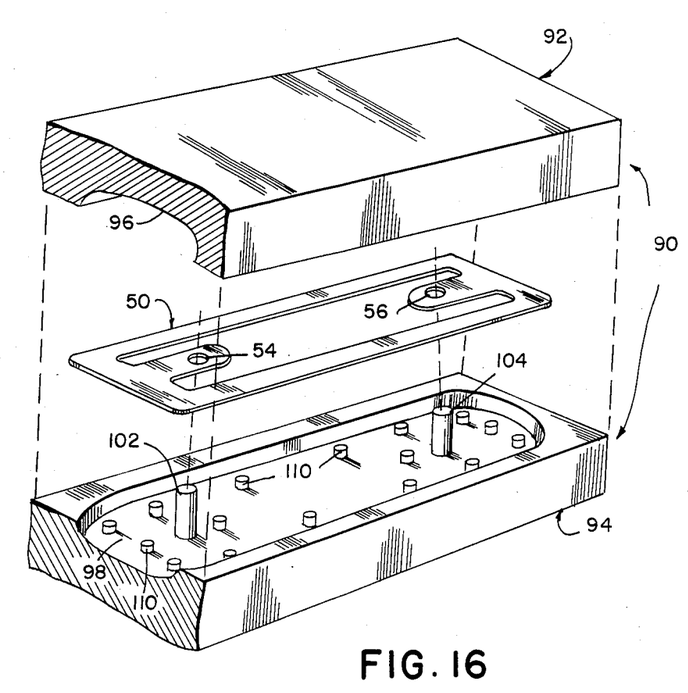
FIG. 16 is a perspective exploded view of the opposite halves of an injection mold used in accordance with the method of FIG. 15 and illustrating the details of a recess within the lower half of the mold and the manner in which the metal plate is initially located within the mold.
Figure 17:
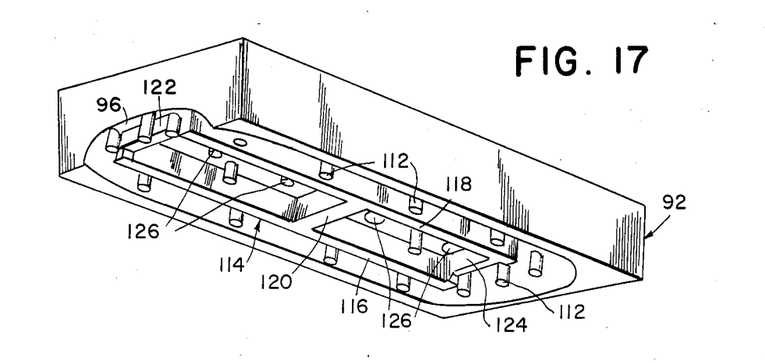
FIG. 17 is a perspective view of the top half of the mold of FIG. 16 illustrating the details of a recess therein.
Figure 18:
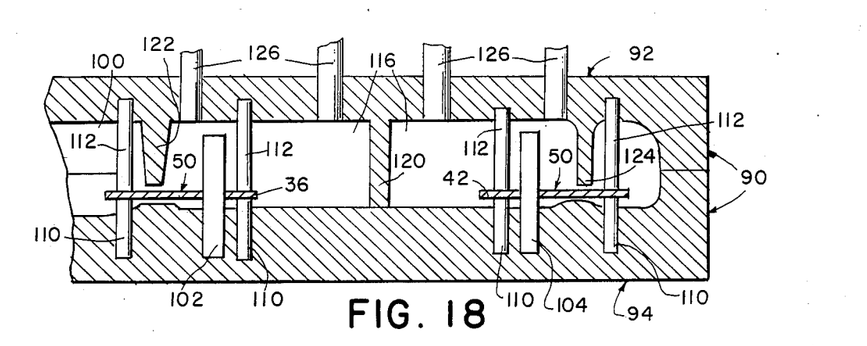
FIG. 18 is a sectional view of the mold of FIG. 16 with the two mold halves joined together and a metal plate disposed within the cavity formed therebetween.

FIGS. 16–19 show an injection mold 90 for use in the method of FIG. 15. The mold 90 includes an upper mold half 92 and an opposite mating lower mold half 94. The upper mold half 92 is provided with a recess 96 in a lower surface thereof. The lower mold half 94 is provided with a recess 98 in an upper surface thereof. The recesses 96 and 98 combine to form a cavity 100 which is shown in FIG. 18 and which has the desired shape of the toothbrush frame 12 to be formed.

A pair of upstanding dowels 102 and 104 are mounted in the recess 98 in the lower mold half 94 and extend upwardly therefrom. The dowels 102 and 104 are spaced apart from and generally parallel to each other within the recess 98. With the opposite mold halves 92 and 94 separated from one another, the metal plate 50 is initially positioned within the recess 98 in the lower mold half 94 by lowering the metal plate 50 onto the dowels 102 and 104 so that the dowels 102 and 104 are inserted in the apertures 54 and 56 respectively in the metal plate. With the dowels 102 and 104 inserted in the apertures 54 and 56, the metal plate 50 is lowered further into the recess 98 until it comes to rest on the tops of a plurality of upstanding metal pins 110 mounted on the bottom surface of the recess 98. The metal pins 110 are generally parallel to each other and to the dowels 102 and 104. The upper mold half 92 is then lowered onto the lower mold half 94.

The details of the recess 96 within the upper mold half 92 are shown in FIG. 17. As shown in FIG. 17 a plurality of metal pins 112 are mounted within the recess 96 so as to extend downwardly from the surface of the recess 96. The upper mold half 92 is also provided with a partition structure 114 which extends downwardly from the surface of the recess 96.

As perhaps best shown in FIG. 18 the tops of the metal pins 110 mounted within the lower mold half 94 lie within a common plane defining the desired location of one of the opposite surfaces of the metal plate 50 when the metal plate 50 is mounted within the injection mold 90. The lower ends of the metal pins 112 which are generally parallel to each other and which are mounted within the upper mold half 92 lie within a common plane which defines the desired location of the opposite surface of the metal plate 50. Each of the metal pins 110 is disposed oppositely from and shares a common axis of elongation with a mating one of the metal pins 112, so that the metal pins 110 and 112 sandwich the metal plate 50 therebetween, as shown in FIG. 18. Thus, following the initial positioning of the metal plate 50 within the lower mold half 94 using the dowels 102 and 104, the upper mold half 92 is lowered onto the lower mold half 94 until the two mold halves are joined together. When this occurs the metal pins 110 and 112 sandwich the metal plate 50 therebetween and hold the metal plate 50 in a precise location within the cavity 100 in preparation for formation of the toothbrush frame 12.

The partition structure 114 which is mounted within the recess 96 in the upper mold half 94 determines the shape of the tabs 20 and 22 of the toothbrush frame 12 to be formed within the mold 90. The partition structure 114 has a pair of opposite, relatively thin, generally planar sides 116 and 118 and an intermediate member 120 extending between and joining the opposite sides 116 and 118 at an intermediate portion of the sides 116 and 118. With the upper mold half 92 closed on the lower mold half 94 the sides 116 and 118 and the intermediate member 120 extend into contact with the surface of the recess 98 in the lower mold half 94. As a result, when the toothbrush frame 12 is formed within the cavity 100, each of the tabs 20 and 22 has three sides thereof which are completely separated from the base 16. The three separated sides of each of the tabs 20 and 22 are formed by the sides 116 and 118 and the intermediate member 120 of the partition structure 114.

The partition structure 114 also includes a pair of ends 122 and 124 extending between the sides 116 and 118 at the opposite ends of the sides 116 and 118. As shown in FIG. 17 as well as in FIG. 18, the ends 122 and 124 have a height which is less than the height of the sides 116 and 118 and the intermediate member 120 so as to form small spaces with the adjacent surface of the metal plate 50 at the lobes 36 and 42 when the upper mold half 92 is lowered into position onto the lower mold half 94. This allows the thin layers 34 and 40 to be formed in the hinging regions 24 and 26 upon formation of the toothbrush frame 12. In like fashion small spaces between the opposite surface of the metal plate 50 at the lobes 36 and 42 and the surface of the recess 98 when the upper mold half 92 is lowered into position onto the lower mold half 94 allow the thin layers 35 and 41 to be formed in the hinging regims 24 and 26 upon formation of the toothbrush frame 12.

Figure 19:
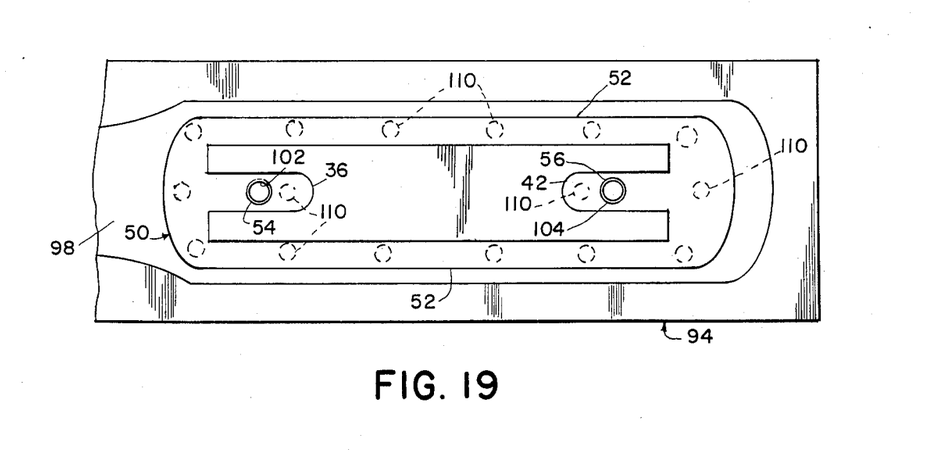
FIG. 19 is a top view of the lower half of the mold of FIG. 16 with the metal plate positioned thereon.

The locations of the mating metal pins 110 and 112 relative to the metal plate 50 are illustrated in FIG. 19 which shows the metal plate 50 when it is properly located within the lower mold half 94. The various metal pins 110 which are mounted within the recess 98 are shown in dotted outline in FIG. 19. As seen in FIG. 19 the dowels 102 and 104 extend through the apertures 54 and 56 in the lobes 36 and 42 of the metal plate 50. One of the metal pins 110 is disposed adjacent the dowel 102 and supports the outer end of the lobe 36. Another one of the metal pins 110 is disposed adjacent the dowel 104 and supports the outer end of the lobe 42. The generally continuous outer portion 52 of the metal plate 50 is supported by fourteen of the metal pins 110.

To form the toothbrush frame 12, the metal plate 50 is placed on the lower mold half 94 by placing the apertures 54 and 56 over the dowels 102 and 104 and then lowering the plate 50 onto the metal pins 110 in the manner previously described. The upper mold half 92 is then lowered onto the lower mold half 94 so that the two mold halves 92 and 94 are joined together as shown in FIG. 18. The cavity 100 formed therebetween is then injected with a heated, molten plastic material such as nylon under high pressure. The plastic material fills the entire space within the cavity 100 and surrounds the metal plate 50 in the process.

FIGS. 16–19 show only those portions of the mold halves 92 and 94 which are employed in forming the base 16 including the tabs 20 and 22. In actuality the mold halves 92 and 94 are considerably longer than shown and extend to the left in the figures shown so as to form the handle 14 together with the base 16 and the tabs 20 and 22.

Following injection of the plastic material into the cavity 100, the material is allowed to cool prior to separation of the mold halves 92 and 94. When the plastic material has cooled sufficiently, the opposite mold halves 92 and 94 are then separated. Because the metal pins 110 in the lower mold half 94 extend into the formed toothbrush frame 12 a relatively small distance compared with the metal pins 112 of the upper mold half 92, the formed toothbrush frame 12 tends to stick on the upper mold half 92 and separate from the lower mold half 94 upon separation of the mold halves 92 and 94. The formed frame 12 is then separated from the upper mold half 92 using a plurality of ejector pins 126 which are shown in FIGS. 16–18. The four ejector pins 126 are moved forward and into the recess 96 of the upper mold half 92 so as to contact the frame 12 and push the frame 12 off of the metal pins 112. This separates the toothbrush frame 12 from the upper mold half 92. The areas of contact by the ejector pins 126 which occur on the tabs 20 and 22 are shown in dotted outline in FIG. 8. The various apertures which are formed in the opposite sides of the base 16 and the tabs 20 and 22 of the frame 12 due to the metal pins 110 and 112 are not shown for reasons of simplicity.

As previously noted the completed toothbrush 10 is formed by drilling holes in the base 16 and the tabs 20 and 22 of the formed toothbrush frame 12 and then mounting groups of the bristles 18 therein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A toothbrush comprising the combination of a handle portion, a base portion at an end of the handle portion and having a central aperture therein, at least one tab portion disposed within the central aperture of and adjacent and moveable relative to the base portion, a metal plate embedded in the base portion so as to surround at least a substantial portion of the central aperture and extending into the tab portion, a first plurality of bristles mounted in the base portion and a second plurality bristles mounted in the tab portion.

2. The invention set forth in claim 1, further including a second tab portion disposed within the central aperture of and moveable relative to the base portion adjacent the at least one tab portion and receiving a portion of the metal plate therein, and a third plurality of bristles mounted in the second tab portion.

3. A toothbrush comprising the combination of an element of plastic material having an elongated handle portion, a base portion at an end of the elongated handle portion having a central aperture therein and a pair of tab portions disposed within the central aperture of the base portion, a relatively thin metal plate disposed within the base portion and extending around the central aperture and into each of the pair of tab portions from opposite sides of the central aperture, a first plurality of bristles mounted in the base portion, a second plurality of bristles mounted in a first one of the pair of tab portions and a third plurality of bristles mounted in a second one of the pair of tab portions.

4. The invention set forth in claim 3, wherein the second and the third pluralities of bristles are stiffer than the first plurality of bristles.

5. The invention set forth in claim 3, wherein the base portion is of generally planar configuration and has a generally uniform thickness and each of the tab portions has a generally uniform thickness slightly less than the generally uniform thickness of the base portion.

6. The invention set forth in claim 5, wherein each of the tab portions is coupled to the base portion by a portion of the thin metal plate and by a portion of the plastic element surrounding a portion of the thin metal plate and having a thickness substantially less than the generally uniform thickness of the pair of tab portions and the base portion.

7. The invention set forth in claim 6, wherein each of the pair of tab portions is of generally rectangular configuration and is separated from the base portion along three sides thereof.

8. The invention set forth in claim 7, wherein the thin metal plate has a generally continuous outer portion extending around the base portion so as to surround the central aperture and an opposite pair of lobe portions extending inwardly from the outer portion and into the pair of tab portions.

9. A toothbrush comprising the combination of a handle, a base extending from the handle, the base being of generally planar configuration and having a central aperture therein, a metal plate embedded in the base, the metal plate forming an endless loop which surrounds the central aperture, a plurality of bristles mounted in the base, and a pair of elongated tabs disposed within the central aperture in the base and coupled to the base by different portions of the metal plate which extend into the central aperture from the endless loop, and further pluralities of bristles mounted in the pair of elongated tabs, each of the tabs being capable of resilient flexing to the side of the generally planar configuration of the base.

10. The invention set forth in claim 9, wherein the base and the pair of tabs are integrally formed from a single piece of plastic material which extends in separate thin layers from the base to each of the tabs in the region of the metal plate.

11. The invention set forth in claim 10, wherein the base has a pair of opposite, generally planar surfaces, each of the tabs has a pair of opposite, generally planar surfaces which are generally coplanar with the pair of opposite, generally planar surfaces of the base and the metal plate is of generally planar configuration and is generally parallel to the pair of opposite, generally planar surfaces of the base and is disposed substantially closer to one of the pair of opposite, generally planar surfaces of the base than to the other one of the pair of opposite, generally planar surfaces of the base.

* * * * *